United States Patent [19]

Deglin

[11] 4,305,148

[45] Dec. 8, 1981

[54] AUTOMATIC EXCHANGE WITH A DIGITAL SWITCHING NETWORK

[75] Inventor: René Deglin, Vélizy-Villacoublay, France

[73] Assignee: Compagnie Industrielle des Telecommunications Cit-Alcatel, Paris, France

[21] Appl. No.: 127,611

[22] Filed: Mar. 6, 1980

[30] Foreign Application Priority Data

Mar. 8, 1979 [FR] France .................... 79 05971

[51] Int. Cl.³ .................... H04Q 3/54; H04Q 11/04
[52] U.S. Cl. .................... 370/58
[58] Field of Search .................... 179/18 ES, 18 EE; 370/58, 53, 59, 66, 70, 77, 98

[56] References Cited

U.S. PATENT DOCUMENTS 4,119,803 10/1978 Jacob .................... 370/58

*Primary Examiner*—Thomas A. Robinson
*Attorney, Agent, or Firm*—Sughrue, Mion, Zinn, Macpeak and Seas

[57] ABSTRACT

An automatic exchange with a digital switching network, for the connecton of circuits or subscriber lines, said exchange comprising at least one central computer, signalling receiver and sender peripherals serving said circuits or lines, switching network marker peripherals, all said peripherals being placed under the control of the central computer, and said circuits or lines being connected to the switching network by digital channels in time division multiplex links characterized in that certain peripherals (UPI, LMQ) are piloted by the computer through the switching network RCX, the messages enabling computer (UCA) to pilot at least one peripheral (UPI, LMQ) being carried by a digital connection comprising two TDM-PCM links (MIC-C, MIC-P/MIC-M) connected to the switching network, the first said link (MIC-C) connecting to the computer, and the second (MIC-P/MIC-M) connecting to said peripheral (UP1/LMQ).

5 Claims, 4 Drawing Figures

1

AUTOMATIC EXCHANGE WITH A DIGITAL SWITCHING NETWORK

FIELD OF THE INVENTION

The invention concerns an automatic exchange comprising a digital switching network and stored program control vested in a central computer. It is applicable in the telecommunications industries.

BACKGROUND OF THE INVENTION

Automatic telephone exchanges comprising digital time-switching networks for the switching of telephone channels carried in time division multiplexes employing pulse code modulation (PCM) for example, are known. In a certain digital PCM transmission system, signalling is transmitted in predetermined time-slots of the time division multiplex, being injected and removed by peripheral units linked to the central computer.

The switching network is controlled by the computer through a marking peripheral. Regarding injection and extraction of signaling information, the appearance of the digital switching network has made it more economic to use said network itself, doing away with the testers and distributers previously carrying out these functions in the line equipment groups or preselection stage. The contents of the signalling time-slots of incoming and outgoing PCM systems are switched on digital PCM systems assigned to signalling peripherals. Exchanges of this type are described in the journal "COMMUTATION ET ELECTRONIQUE" No. 56 of January 1977, pages 39 to 43, FIG. 1, and in No. 59 of October 1977, pages 35 and 36, FIG. 4.

This type of structure has a disadvantage, namely the cost of linking the signalling peripherals to the computer. Indeed, to retain the advantages of central common control, peripherals may be used which do not analyse signalling information, but simply react to such basic signals as leading pulse edges and status changes. The flows of messages between these peripherals and the computer are then very heavy, and substantial means are needed for their control. An example of such links between peripherals and their computers is described in French Pat. No. 2.346.930 of Mar. 31, 1976, to the present applicant. This type of link demands logical processing facilities at each end (module interfaces CM and concentration processing circuits LC).

Further, the cost of such links can increase substantially with their length.

The purpose of the invention is to do away with these disadvantages by making greater use of the digital PCM channels switched through the switching network.

SUMMARY OF THE INVENTION

The invention is an automatic exchange comprising a digital switching network for the connection of circuits or subscriber lines and with at least one central control computer, signalling sender and receiver peripherals serving said circuits or lines and switching network marker peripherals. All said peripherals are under the control of the central computer, said circuits or lines are linked to the switching network by digital channels carried in time division multiplexes. Further, certain peripherals are controlled by the computer through the switching network. The messages controlling at least one peripheral from the computer occupy a digital channel on two time-multiplexed links connected to the switching network, the first of said links being connected to the computer, and the second to said peripheral. At least one signalling peripheral (UPI) is connected to the switching network RCX by a TDM-PCM link (MIC-P), said link comprising channels connected through the switching network to the signalling channels of digital PCM links (MIC-A), assigned to said circuits or said subscriber lines, and also channels connected through the switching network to channels in digital PCM links (MIC-C) connecting to the computer.

The features and advantages of the invention will be clearly seen in the following description of one of its embodiments shown as an example with reference to the following figures.

DESCRIPTION OF THE PREFERRED EMBODIMENT

Figure 1:
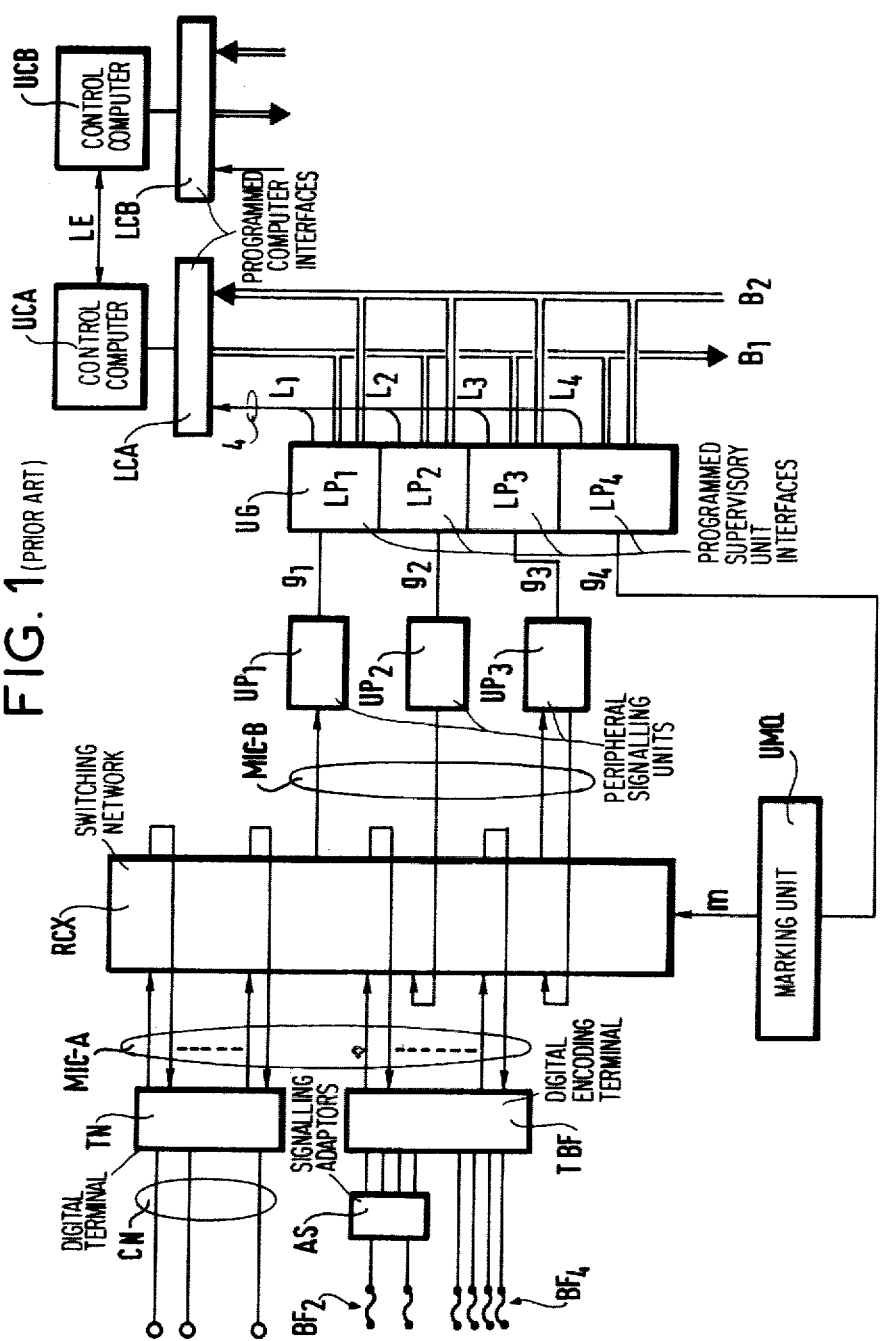
FIG. 1 is a circuit diagram of a prior art automatic telephone exchange to which the embodiment of the invention described hereafter is applied.

The embodiment described relates to a transit telephone exchange with time-switching network. An automatic exchange of this type produced according to the former state of the art is represented in FIG. 1. Its control computer is duplicated (UCA, UCB) for reliability of service. Said two computers UCA, UCB are interconnected by link LE and operate, for example, in the load-sharing mode. The circuits connected to the exchange may be either digital CN or audiofrequency, two-wire BF2, or four-wire BF4.

The digital-PCM links connecting to the switching network RCX are PCM links according to the European standard. It is recalled that this standard provides a multiplex of 32 channels sampled at the rate of 8 kHz, each channel being encoded as an 8-bit word. These frames are marshalled into multiframes of 16 frames. Signalling is carried in the no. 16 channel of each frame, frame number i carrying the signalling relating to channels i and i+16, each encoded as a 4-bit word in the signalling channel. A frame marker signal is carried in channel no. 0 of the even-number frames, and a multiframe marker signal is carried in channel no. 16 of frame no. 0.

Signalling may also be transmitted on separate PCM links called common mode signalling channels.

The PCM links between the circuits and switching network RCX are shown as MIC-A in FIG. 1. The digital circuits CN are connected to said links MIC-A by a digital terminal TN in which signal pulse shaping is performed. The 4-wire audiofrequency circuits BF4 are connected to a terminal TBF, in which the signal on incoming circuits is filtered and sampled, and converted to digital code. TBF also digitally encodes signalling and injects signalling into channels nos. 16 of the digital frames. In respect of outgoing circuits, TBF carries out the reverse function.

Two-wire audiofrequency circuits BF2 are connected to terminal TBF by signalling adaptors AS, in which 2-wire to 4-wire conversion is performed. The peripherals include signalling units UP1 to UP3, and a marking unit UMQ. The marking unit is connected to the switching network by a command link m, whereas peripherals UP1 to UP3 are connected to said switching network by PCM links shown as MIC-B. Units UP1 are equipped for example with decimal numbering senders and receivers, and units UP2 will be equipped for example with compelled multifrequency senders and receivers. Units UP3 may be common mode signalling processors.

Computers UCA, UCB control the use, maintenance, and operation of the signalling units and switching network.

The invention concerns the last two items only, through computer interfaces LCA, LCB, which are programmed interfaces supervising the peripheral units. Supervision of computer-peripheral message flows at the peripheral unit level is by a supervisory unit comprising, for example, four programmed interfaces LP1 to LP4 assigned to signalling units UP1 to UP3 and marker interface UMQ. Said interfaces LP1 to LP4 may be of the same type and specifically programmed. Links g1 to g4 between peripherals and interfaces LP1 to LP4 are specific to each unit of each type, for example, in the case of the units in UP1, there will be a link for each decimal receiver and a link for each sender.

Links between interfaces LP1 to LP4 and computer interfaces LCA, LCB comprise, for example, individual command links L1 to L4, and busses B1 and B2 to carry incoming and outgoing messages.

The connections provided between PCM links MIC-A and MIC-B for the transmission of reception of signalling may be either permanent or established on demand. For example, permanent connections may be provided for decimal signalling, a single PCM link MIC-B being able to carry signalling information on 31 channels in permanent connection with the no. 16 channels of 31 MIC-A PCM links, namely the signalling relative to 930 telephone circuits.

Figure 2:
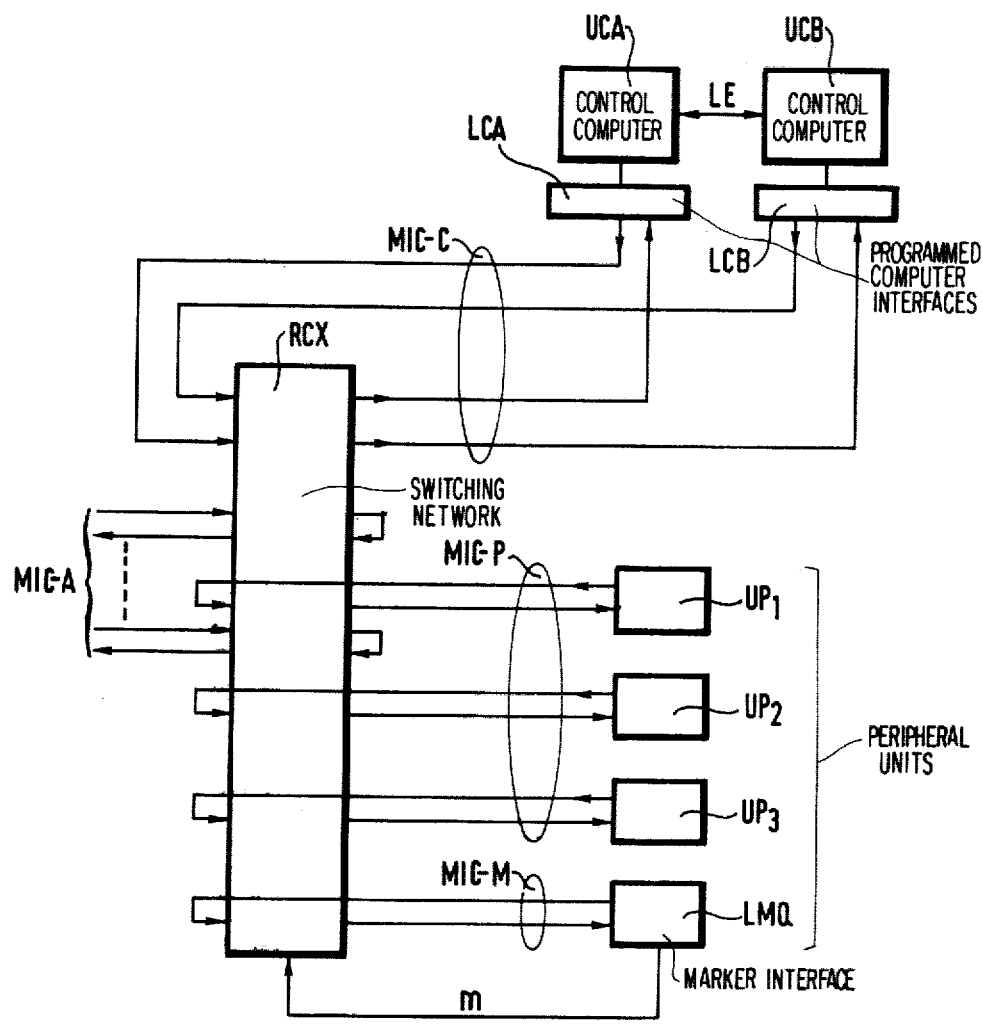
FIG. 2 is a circuit diagram of an automatic exchange according to the invention.

Application of the invention to an exchange of the earlier type is represented in FIG. 2, which shows the same units and uses the same references as in FIG. 1, but in which the supervisory units UG are absent, since the invention makes it possible to do away with units supervising message exchanges between peripheral units UP1 to UP3 and LMQ, and computers UCA, UCB, all said exchanges between said units and computers being made on PCM links connected to the switching network RCX.

Each channel in a digital PCM link contains 8 bits, and therefore constitutes a digital data transfer channel at 64 Kbits/second. This bit rate is sufficient for transmission of messages between computers and a sending or receiving peripheral: in a large capacity exchange, in which there would be, for example, 64 senders and receivers, 16 common mode signalling channels, and 2 marking units, namely 82 units in total, 3 digital PCM links between computers UCA, and UCB and the switching network RCX would be sufficient. For reliability of service, four could be provided, for example, and these are shown as MIC-C in FIG. 2.

For each sender or receiver, the computer data exchange channel would be one of the channels in a digital PCM link with the switching network, shown as MIC-C in FIG. 2.

A MIC-P digital PCM link of 32 channels will therefore include one data link control channel, 29 channels connected to the MIC-A links, and two channels connecting to MIC-C links, on the basis of one per computer.

There is advantage in making general use of the means of connection with the markers by PCM link. A marker interface LMQ is shown in FIG. 2 as connected to the switching network RCX by a command link m. For flexibility of operation, a programmed LMQ is an advantage. It receives a command from computer UCA, UCB as usual, for each change to be made in the switching network RCX, while its program maintains all connections already established. Each such command from UCA-UCB concerning the setting up of a path through the switching network RCX is transformed into individual commands sent to each of the circuits controlling the connection points.

A problem arises out of the fact that the marking interface LMQ receives its commands through the connection network RCX, and it is the self-same interface which commands the setting up of paths through said network. It may therefore have a wired initializing program in a ROM, which when the interface is switched on, sets up connection of its MIC-M link to the switching network, plus those of the MIC-C links, and possibly certain MIC-P links.

We shall now define as an example the means that may be used to supervise the 64 Kbit/sec. data channels between the computers and peripherals, and the message format used.

Messages from computer to peripheral may be commands or demands for message repetition. In the opposite direction, they are reports of command execution, fault reports and event reports.

The format of the messages placed in queue is shown in the table below: these are variable format messages free of certain complicating procedures, such as the use of error correction codes. The length of each section of a message is shown underneath the section by a number stating the number of bits.

Using a variable format message makes for extreme flexibility, whereby it is possible to follow the same procedure, whatever the type of unit.

| FL | TD | NE | NR | ETQ | R | D | F | DV | CR |
|---|---|---|---|---|---|---|---|---|---|
| bits 8 | 6 | 3 | 3 | 6 | 1 | 1 | 1 | X | 1 |

The various parts of a message signify:

FL: A flag, which is a binary profile marking the start of the message.

TD: The size of the variable part of the message reserved for data.

NE: The number of the message sent, used to address a buffer transmission memory.

NR: Number of the message acknowledged.

ETQ: The label used by the computer to associate an execution report with the order to which referring.

R: Parity check result.

D: Readiness of the unit to receive a further message.

F: Identifies a fault report.

DV: Variable data. This is the message itself, of which the length is stated by parameter TD.

CR: Redundant code stating the parity of the bytes of a message, flag excluded.

Figure 3:
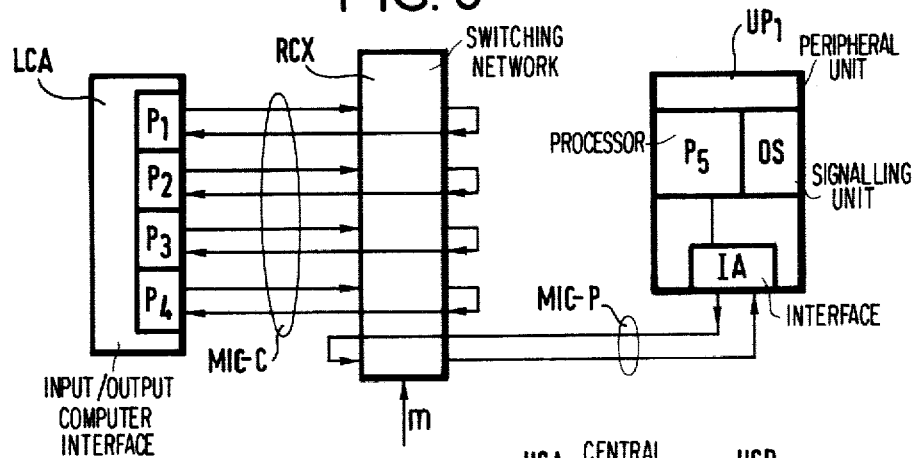
FIG. 3 is a circuit diagram of the units linking the central computer with the peripherals.

The principle proposed for control of the 64 Kbit/sec. data exchange channels is based on message queueing. Transfers between queues and digital PCM channels are controlled by limited capability processors, for example type 8080 microprocessors produced by the INTEL Company, as shown in FIG. 3.

If each computer UCA-UCB is connected to the switching network RCX by four MIC-C PCM links, computer interface LCA will comprise four processors P1 to P4, each assigned to one PCM link. In the peripheral unit, for example UP1, processor P5 is assigned to control of PCM link MIC-D (or MIC-M, if the peripheral is a marker interface LMQ), being connected to the link by interface IA.

The variable data portion of the message is then handled by a signalling unit OS of the peripheral, OS being, for example, a sender or a receiver in decimal or CMF numbering.

For message transmission, a buffer storage of 16 cells, for example, is provided at each end of a data link, each cell being able to contain one message. Associated with each buffer storage, there would be a queue of free cell addresses, and a queue of the addresses of buffer memory cells containing messages for transmission.

Messages are put in queues at the receiving end.

The RAMs and queues are under the control of the processor assigned to the data link. For efficient programming adjustments to suit particular cases, microprogrammed processors are preferable.

The invention does not concern the type of link used between central computer and its input/output interface LCA or LCB. However, it would seem an advantage, at the computer-input/output interface level, to adopt message queueing that re-assembles the queues controlled by processors P1 to P4: in such case, there would be a command, command acknowledgement, fault report, and event signalling queue per peripheral unit type UP1, UP2, and UP3, and a command, execution report, and fault report queue per peripheral unit type LMQ.

It is stated above that the peripheral units handle basic events only, sending a message in respect of each. The structure described remains valid even if a certain amount of signalling preprocessing is vested in these units. This can be of advantage, for example, when pre-processing is independent of exchange environment.

In such case, pre-processing programs for said peripherals can, for example, be stored in a ROM or PROM, and may, for example, confirm recognition of digits in decimal number signalling, instead of simple recognition of pulse leading edges, or the distribution of compelling signals in CMF code, or, again, recognition of characters in applications to data transmission.

Figure 4:
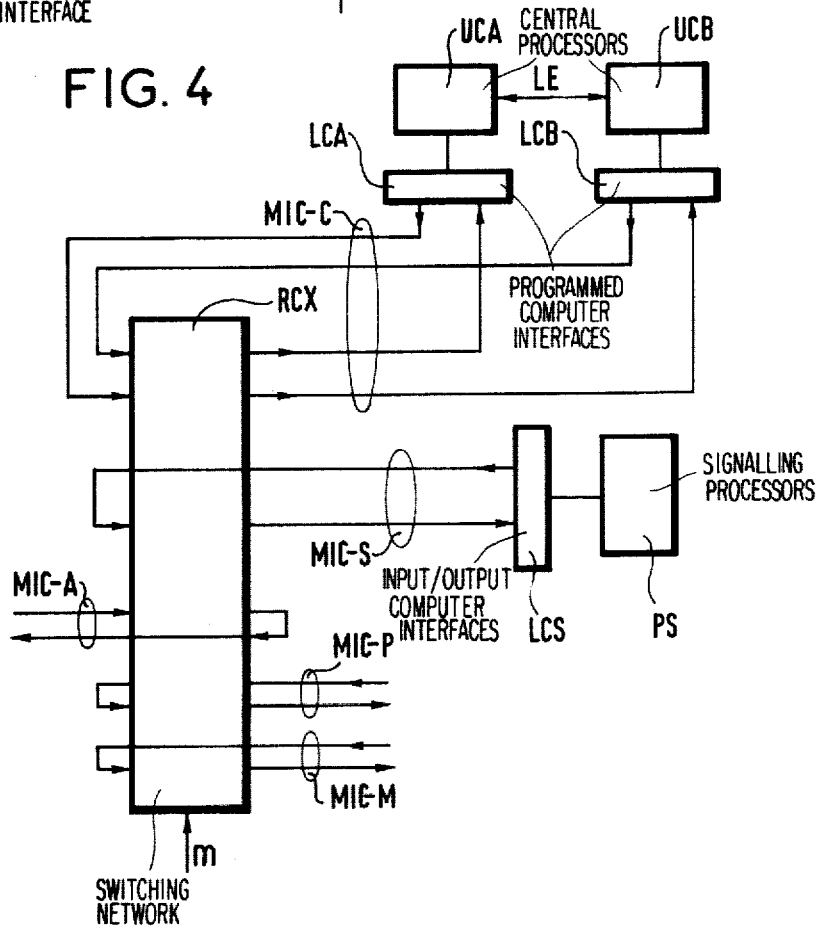
FIG. 4 is a circuit diagram of an exchange comprising signalling processors.

An organization in which a more highly developed level of signalling processing can be obtained by pre-processing by means of signalling processors PS, other than the central processor, may also be obtained using the structure of links in accordance with the invention. An example of said organization is shown in FIG. 4, in which signalling processors PS are connected through input/output interfaces LCS to a number of PCM links MIC-S connecting into the switching network. Said PCM links are analogous with the MIC-C links, and they are identically controlled.

According to exchange environment, either only two processors PS are used in the load-sharing mode to handle all signalling, or several processors PS are used to handle one type of signalling alone each.

Switching network RCX can then provide fixed assignment of part of the channels of each MIC-S link to MIC-P link channels, the remaining channels being assigned to MIC-C links.

The processing programs can be loaded into the working memories of said processors PS by central processors UCA, UCB using PCM links, thus producing a structure in which the PCM links and switching network form data links between computers.

For signalling, the structure described forms a three-level hierarchy: the peripheral units, the signalling processors, and the central computers. For the overall control of the exchange, the structure retains centralised control, the central computers remaining responsible for system operation, maintenance, call routing, and switching network command.

The invention is not limited to the embodiment described but is in particular applicable to other types of automatic exchange and other types of digital PCM links, such as links carrying other quantities of channels, or other quantities of bits per channel.

I claim:

1. In an automatic exchange with a digital switching network, for the connection of circuits or subscriber lines, said exchange comprising; at least one central computer, signalling receiver and sender peripherals serving said circuits or lines, switching network marker peripherals, said central computer controlling all of said peripherals, and said circuits or lines being connected to the switching network (RCX) by digital channels in time division multiplex links; the improvement wherein certain peripherals (UP1, LMQ) are piloted by the computer through said switching network RCX, the messages enabling computer (UCA) to pilot at least one peripheral (UP1, LMQ) being carried by a digital connection comprising two TDM-PCM links (MIC-C, MIC-P/MIC-M) connected to the switching network (RCX), the first said link (MIC-C) connecting to the computer, and the second (MIC-P/MIC-M) connecting to said peripheral (UP1/LMQ), and wherein at least one signalling peripheral (UP1) is connected to the switching network RCX by a TDM-PCM link (MIC-P), and said link comprising channels connected through the switching network to the signalling channels of digital PCM links (MIC-A), assigned to said circuits or said subscriber lines, and also channels connected through the switching network to channels in digital PCM links (MIC-C) connecting to the computer.

2. The exchange according to claim 1, wherein a switching network marker peripheral (LMQ) is piloted by the computer by means of at least one channel in the digital PCM link (MIC-C) between the computer and switching network, and a TDM-PCM link (MIC-M) between the switching network and the marker peripheral, and said peripheral (LMQ) containing an initialising program, which upon switching on the peripheral sets up interconnection through the switching network between the links transmitting said digital channel between computer and marker peripheral.

3. The exchange according to claim 1, wherein the data channels between central computer and peripherals are supervised at each end by a processor (P1 to P5), including means for handling messages exchanged on said data channels in queues between the computer and its input/output interface (LCA), and at the peripheral end in queues between processor and signalling or markig peripheral itself.

4. The exchange according to claim 1, further including means for submitting signalling sent and received by means of peripherals (UP1 to UP3) to pre-processing in a signalling processor (PS), and wherein said signalling processor PS is connected to the switching network by a TDM-PCM link (MIC-S), means for performing message exchanges between the peripherals and processor (PS) by assigning digital channels pertaining to one link (MIC-S) to digital channels of a link pertaining to one peripheral (MIC-P), and means for connecting the signalling processor and central computer by assigning channels in time division multiplexes (MIC-S) to channels in TDM-PCM links (MIC-C) connecting to the computer.

5. The exchange according to claim 3, wherein said processors (P1 to P5) for the control of message queueing comprise facilities for variable format message processing, such that message processing is the same, whatever the originating or destination peripheral.

* * * * *